United States Patent [19]

Cohen

[11] Patent Number: 4,469,938
[45] Date of Patent: Sep. 4, 1984

[54] SOLAR TRACKING UNIT

[76] Inventor: Eli Cohen, 350 Continental Ave., Paramus, N.J. 07652

[21] Appl. No.: 524,200

[22] Filed: Aug. 18, 1983

[51] Int. Cl.³ .............................................. G01J 1/20
[52] U.S. Cl. .................................. 250/203 R; 126/425
[58] Field of Search .................. 250/203 R, 208, 209, 250/212; 126/424, 425

[56] References Cited

U.S. PATENT DOCUMENTS

| | | | |
|---|---|---|---|
| 2,155,402 | 4/1939 | Clark | 250/203 R |
| 4,031,385 | 6/1977 | Zerlaut et al. | 250/203 R |
| 4,068,653 | 1/1978 | Bourdon et al. | 126/271 |
| 4,078,549 | 3/1978 | McKeen et al. | 126/425 |
| 4,098,264 | 7/1978 | Brokaw | 126/271 |
| 4,153,039 | 5/1979 | Carroll | 126/271 |
| 4,184,482 | 1/1980 | Cohen | 126/425 |
| 4,223,214 | 9/1980 | Dorian et al. | 126/425 |
| 4,242,580 | 12/1980 | Kaplow et al. | 250/203 R |
| 4,304,993 | 12/1981 | Carden | 126/425 |
| 4,321,909 | 3/1982 | Trihey | 126/425 |
| 4,328,417 | 5/1982 | Himes | 250/203 R |
| 4,332,240 | 6/1982 | Ward | 126/425 |
| 4,349,733 | 9/1982 | Beam et al. | 250/203 R |

OTHER PUBLICATIONS

Informational brochure entitled "Information and Instructions", for Solarex Solar Cells, Panels and Microgenerators, Edmund Scientific Co., Barrington, N.J., pp. 1–4, Rev. 12/80 (5M).
"Solar Age", Apr. 1983, pp. 23–25 by David Holzman.

Primary Examiner—David C. Nelms
Attorney, Agent, or Firm—Mitchell B. Wasson; Martin P. Hoffman; Charles W. Fallow

[57] ABSTRACT

A solar tracking system having particular utility for insuring that a relatively lightweight solar collector is properly positioned with respect to the sun. A parabolic reflector surface is included to provide a line of focus of the sunlight directed toward a cylindrical energy absorption tube. Photovoltaic cells provided on either side of the energy absorption tube are directed toward the parabolic reflector surface. A reversible motor is electrically connected to the cells and physically connected to the reflector system for correcting any misalignment with respect to the sun. The reversible motor can be used as the sole means for powering the tracking system or can be used in conjunction with an outside power source.

13 Claims, 5 Drawing Figures

SOLAR TRACKING UNIT

BACKGROUND OF THE INVENTION

Over the past century, fossil fuels such as oil, coal and natural gas have provided a large portion of the energy utilized by the civilized world. Although increases in costs for providing these fuels have abated in the last several years, the relatively high cost of these fuels and their decreasing abundance have forced energy planners to look elsewhere for a continuing source of power to be provided to the end of this century and into th next century. Due to its virtually limitless supply and accessibility, these engineers have been directing their efforts to harnessing the energy of the sun. These efforts have resulted in the development of various devices such as flat plate collectors or solar concentrators.

The flat plate collector consists of a black plate covered by one or more transparent cover plates of glass or plastic with the sides and bottom of a box being insulated. Sunlight is transmitted through the transparent cover plates and absorbed by the black surface underneath. The plates tend to be opaque to infrared radiation and also retard convective heat transfer. The black plate heats up and in turn heats a fluid flowing under, through, or over the plate. However, it should be noted that due to this design, temperatures which are produced are below the boiling point of water.

Solar concentrators, on the other hand, may be used to produce temperatures in excess of 300° F. for efficient electrical power generation, for industrial and agricultural drying and for other applications such as to increase the power output of photovoltaic cells. These concentrators usually consist of a parabolic reflector which produces a line of focus directed to a cylindrical energy absorption tube having a movable liquid therein. The heat induced in this liquid is then transferred to a boiler for direct usage or storage. However, because the temperature of the liquid bears a direct relation to the amount of sunlight focused upon the cylindrical energy absorption tube, any misalignment of the reflective surface with respect to the sun would mean that the line of focus is not exactly directed at the energy absorption tube and the amount of energy converted is lessened. Therefore, it is important that a mechanism be provided that would simply and accurately track the sun with respect to the parabolic reflector and move the reflector in conjunction with movement of the sun with respect to the reflector. It has been determined that the desert regions of the world, such as the Sahara, are expanding thereby limiting the area that people indigenous to this region can use as a food source. Part of this expansion is due to deforestation caused by the burning of wood for heat and energy. Therefore, if a solar energy collector could be produced which may be utilized by these people in place of wood, the problem of deforestation could be alleviated. However, since prior to solar tracking systems utilized an outside power source, it is imperative that a self-powered tracking system be developed which can be used in desolute areas by people not having accessibility to these power sources.

DISCUSSION OF THE PRIOR ART

Due to the primitive state of the art, early solar tracking systems had to use relatively great amounts of energy to power large and cumbersome solar concentrators which had been developed. Additionally, because of the relative advanced state of computers and microprocessors with respect to the solar collectors, many sophisticated systems employing the use of computer aided trackers were proposed.

However, in recent years, solar trackers have been developed which use the energy produced by the sun to insure that the solar concentrators are properly positioned. One such device is described in U.S. Pat. No. 4,031,385 issued to Zerlaut et al. This patent employs two photovoltaic cells which are placed on either side of a shield. A differential signal is produced by these cells which is used to power a reversible motor for properly orienting the flat plate collector with respect to the sun. As the sun moves through in the sky with respect to the collector, unequal solar radiation will be received by the cells which would produce a signal on a lead line to the motor. Depending upon the polarity of the signal, the motor will either rotate clockwise or counterclockwise.

U.S. Pat. No. 4,098,264, issued to Brokaw, describes a parabolic collector which also employs two photovoltaic cells to control the direction of movement of a reversible motor. Both of the photocells are operating in opposition with one another and if one of the cells is provided with more solar radiation than the second cell, an electric signal is produced to cause the motor to move the reflected surface in the opposite direction.

Other U.S. patents which utilize two photocells to initiate and operate a solar energy tracking system are U.S. Pat. Nos. 4,068,653 issued to Bourdon et al; 4,153,039 issued to Carroll; and 4,349,733 issued to Beam et al. It should be noted that all of the photocells which are employed in the above-cited tracking systems mount the cells such that solar energy directly impinges upon them. Since for the most part, it is important that even slight misalignment of the collector or concentrator with respect to the sun should be corrected, the two cells which are used must be exactly matched since the difference in radiation for a small misalignment which impinges upon the two cells are very slight.

SUMMARY OF THE INVENTION

The present invention improves upon the drawbacks described with respect to the prior art by providing a solar tracking system in which the importance of the matchability of the solar cells is not paramount. This result is accomplished by employing a pair or array of photovoltaic cells on either side of a cylindrical energy absorption tube, said cells being directed toward the parabolic reflective surface of a solar collector and away from the direct radiation of the sun. One cell is connected to one side of a reversible motor and the second cell is connected to the second side of the reversible motor. These cells work in opposition such that if one cell receives more radiation than the other cell, the reversible motor would operate in a direction to alleviate this imbalance. Furthermore, the power to operate the motor is generated by the cells themselves or, if necessary, an outside power source. The motor contains a gear which is connected to a cylindrical tracking rod. The parabolic reflector is provided within a parabolic frame having a continuous wire or filament running from the ends of the frame to the tracking rod. Therefore, movement of the tracking rod caused by movement of the reversible motor causes the reflector to move in a direction to eliminate any misalignment of the reflector with respect to the sun.

DESCRIPTION OF THE PREFERRED EMBODIMENT

Figure 1:
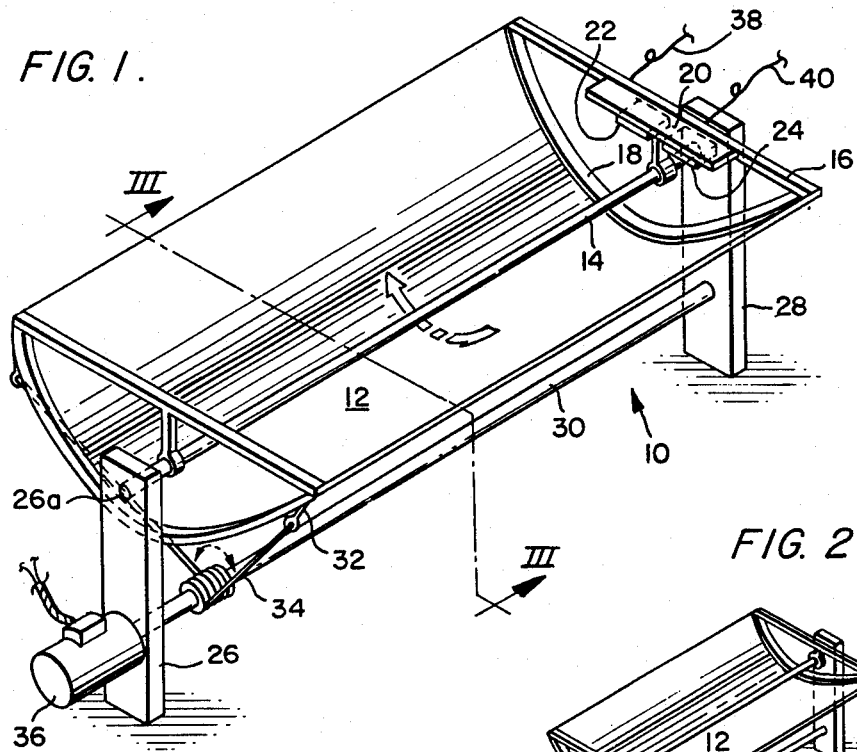
FIG. 1 is a perspective view of one embodiment of the present invention.

As shown in FIG. 1, the present invention is directed to a solar tracking system 10 utilizing a sheet 12 combined into a parabolic shape as a reflector. When properly aligned, energy from the sun would be reflected off of the sheet 12 and directed to a tubular member 14 serving as an energy conversion means. Fluids such as water or silicones circulate through the tube 14 and are heated by the solar energy reflected off of the reflector 12. This heated liquid flows to an energy storage means which is known in the art. The particular energy storage means and the connections between the storage means and the energy absorption tube which is utilized is not crucial and does not form a basis for the present invention.

Figure 3:
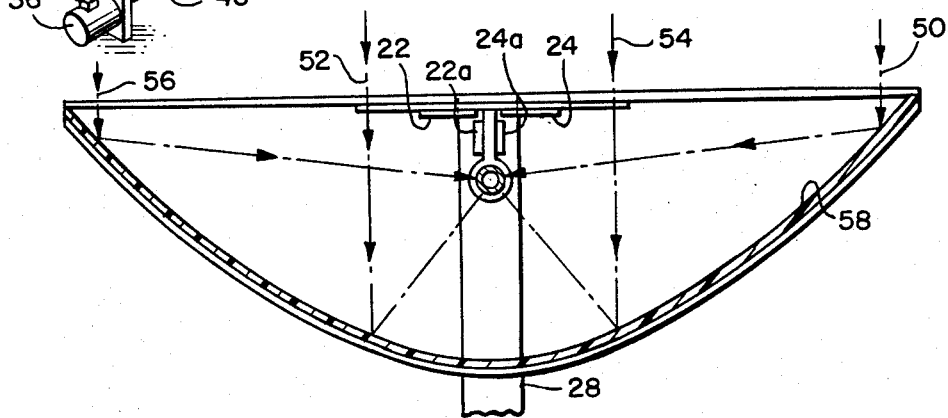
FIGS. 3 and 4 are sectional views of the first embodiment of the present invention taken along lines III—III of FIG. 1 showing the invention when it is aligned and misaligned, respectively.

The sheet 12 must be thin, flexible and lightweight as shown by 58 (see FIG. 3). The sheet can be constructed of a polyester film (such as Mylar) provided with a metalized solar-reflecting surface such as aluminum on at least the side of the sheet facing toward the sun. The sheet is pulled or stretched taut and formed into a parabolic arc through the use of a flexible U-shaped bracket 18 as well as a bracket 16 attached to bracket 18. These brackets give the reflector sheet 12 its parabolic shape and insure that all of the solar energy reflected off of the sheet will be focused on a line commensurate with the energy absorption tube 14. The reflector 12 is supported by providing stands 26, 28. A hole 26a is provided in each of the stands for placement of the energy absorption tube 14. The energy absorption tube 14 is connected to the bracket 16 by a connecting member 28a and a rotating coupling member 30a. This particular configuration allows the frame and reflector to rotate while the energy absorption tube 14 is stable and does not rotate.

It is important that the sunlight is perpendicularly directed onto the reflector surface. If the sunlight is not perpendicularly directed onto the reflector surface, the line of focus produced by the solar energy will not be properly focused onto the energy absorption tube 14. FIG. 3 is a sectional view of FIG. 1 and it shows that when the solar energy (designated by light rays 50, 52, 54 and 56) are perpendicularly directed onto the reflector, a line of focus directed at the energy absorption tube 14 is produced.

Figure 4:
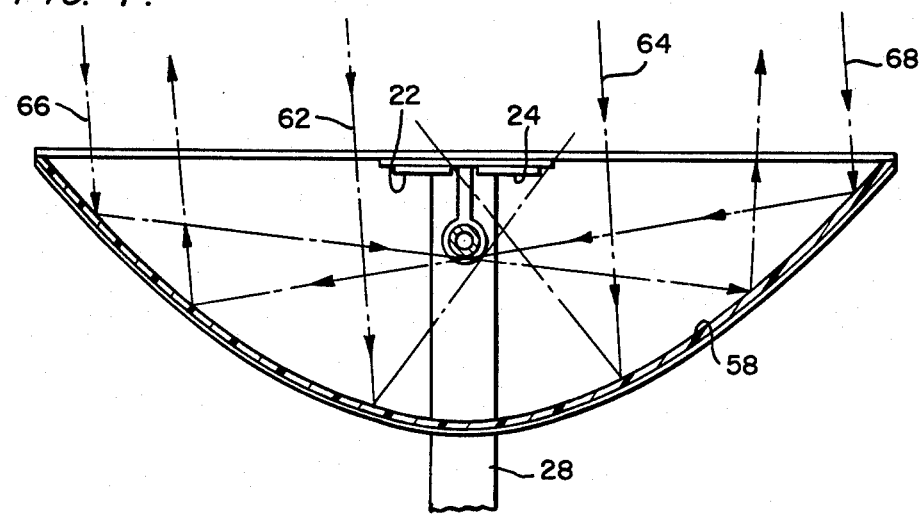

FIG. 4 is a sectional view of FIG. 1 showing an improperly aligned solar collector. In this case, light waves 62, 64, 66 and 68, after their reflection off of the surface 12, are not focused upon the concentrator 14. Rather, these light rays are focused at a line, a small distance from the energy absorption 14. As the sun moves through the sky, the light rays become more skewed, and the line of focus moves further and further from the energy absorption tube 14. Since the amount of energy collected by the solar collector is dependent upon the energy absorbed by the energy absorption tube, it is imperative that the reflector be properly positioned with respect to the sun.

The present invention insures that the sun would be properly tracked by the collector by utilizing the misaligned line of focus. As shown in FIG. 1, a longitudinal support 20 is attached to the bracket 16 on one transverse side of the reflector 12. Two photovoltaic cells 22 and 24 are affixed to the underside of the support 20 by an adhesive or glue. This support 20 extends beyond the edge of reflector 12 and the photovoltaic cells 22 and 24 receive a portion of the energy which is reflected off of the reflector 12. One cell 22 is provided on one side of the energy absorption tube 14 and the second cell 24 is provided on the other side of the energy absorption tube 14. Although many cells could be utilized, typical of the cells which are employed are the SOLAREX solar cells provided by Edmund Scientific. If the collector is properly aligned with respect to the sun, all of the sunlight is reflected onto the concentrator 14 and none onto either of the photovoltaic cells 22, 24. However, if the concentrator is misaligned with respect to the sun, as shown in FIG. 4, the solar energy will not be focused on the concentrator 14 and a portion of the reflected energy will be sensed by one of the cells 22 or 24. Alternatively, photovoltaic cells 22a and 24a can be provided in lieu of cells 22 and 24 on the connecting member 28a. It is also important that the cells which are utilized are as close to the energy absorption tube as possible.

The cells 22 and 24 or cells 22a and 24a are working in opposition to power a small reversible DC motor 36 in one of two directions depending upon which cell senses the reflected solar energy created by a misalignment with respect to the sun. Because of the lightweight material employed as the reflector, the energy produced by either of the cells 22 or 24 or cells 22a and 24a can be solely used to power the motor 36. This motor 36 is connected to a cylindrical tracking rod 30 which is provided under the reflector 12 and is supported by the stands 26 and 28. A wire or filament 34 is connected to the junction between bracket 16 and U-shaped bracket 18 on one transverse side of the reflector 12. This line is attached to this junction by an eye-hook 32 or similar device and is wrapped around the tracking rod 30 for several turns. In this manner, when one of the cells 22 or 24 or 22a or 24a senses a misalignment, the reversible motor 36 will move in a direction to correct the misalignment as shown by the arrow in FIG. 1. This movement rotates tracking rod 30 which, in conjunction with the wire or filament 34, moves the energy absorption tube 24 in the proper direction. As shown in FIGS. 1 and 6, electrical wires 38 and 40 are provided between cells 24 and 22, respectively, on either side of the motor 36. This circuit allows the motor to move in one direction due to the energy converted by one of the cells. If the reflector 12 is properly aligned with respect to the sun, all of the energy will be reflected onto the energy absorption tube 14 and none will be sensed by the cells 22 and 24. Since these cells are working in opposition, the motor would not operate in this case.

Figure 5:
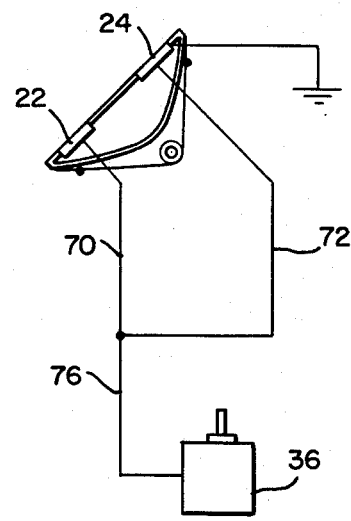
FIG. 5 is a schematic drawing showing a means for powering the tracking system.

FIG. 5 shows a circuit diagram which could be used. In this situation, the output of each of the cells would be conducted via wires 70 and 72, respectively, to a wire 76 which produces a differential output of the cells. The polarity of the voltage across wire 76 would dictate the direction in which motor 36 would operate.

Figure 2:
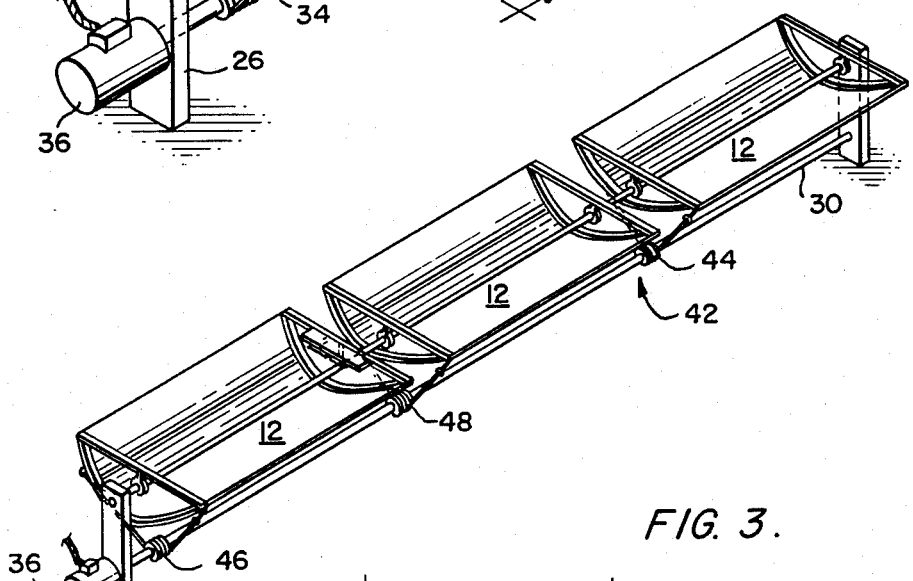
FIG. 2 is a perspective view of a second embodiment of the present invention.

FIG. 2 shows an embodiment 42 of the present invention in which a plurality of reflectors 12 are utilized. Each of the reflectors would employ its own frame but would be tracked in conjunction with a single tracking rod 30 and single DC reversible motor 36. However, it should be noted that each of the frames would contain its own filament or wire 44, 46 and 48 to properly orient each individual collector. Additionally, as shown, only one of the frames would have the photovoltaic cells for properly tracking the sun.

Further modifications of the invention herein described will occur to persons skilled in teh art and all such modifications are deemed to be within the spirit and scope of the present invention as defined by the appended claims. For example, only a single cell was shown on either side of the energy absorption tube to properly track the sun. It should be noted that depending upon the weight of the reflector or the power of the motor utilized, a plurality of cells, attached in series, can be used on either side of the energy absorption tube. Additionally, if a large reflector 12 is used, an outside power source could be employed and the cells 22 and 24 or 22a and 24a would be used to power a switch connecting the outside power source to the motor 36 or directly to the tracking rod. Furthermore, the present invention can be used with dish-shaped parabolic reflectors by providing four photovoltaic cells spaced at 90° around an energy absorption means and rotating the reflector along two axes.

What is claimed is:

1. A solar collector tracking system comprising:
   a parabolic reflector;
   an energy absorption tube provided above and across said parabolic reflector, said energy conversion tube having an energy absorption fluid flowing therethrough;
   a frame provided on at least one end of said parabolic reflector;
   one photovoltaic cell provided on either side of said energy absorption tube, said cells directed downward toward said parabolic reflector and said cells supported by said frame on one transverse side of said parabolic reflector; and
   tracking control means for following the path of the sun and controlling the position of said parabolic reflector with respect to the sun solely determined by the signals produced by said photovoltaic cells.

2. The solar collector tracking system of claim 1 wherein said tracking means includes
   a tracking rod provided in a plane parallel to the longitudinal axis of said parabolic reflector;
   a strand of wire attached to said tracking rod and one end of said parabolic reflector; and
   a reversible DC motor positively connected to said tracking rod for moving said parabolic reflector in two opposite directions along the transverse axis of said parabolic reflector, said motor responsive to and powered solely by the energy produced by said photovoltaic cells.

3. The solar collector tracking system of claim 2 wherein said photovoltaic cells produce a single differential signal inputted to said reversible motor for powering said motor in different directions dependent upon the polarity of said differential signal.

4. The solar collector tracking system of claim 1 wherein a plurality of photovoltaic cells are provided on either side of said energy absorption tube, said cells directed toward said parabolic reflector and said cells supported by said frame on one transverse side of said parabolic reflector.

5. The solar collector tracking system of claim 1 further including a plurality of parabolic reflectors wherein said tracking control means simultaneously controls the position of all of said parabolic reflectors.

6. In a solar collector tracking system having a parabolic reflector, an energy absorption tube provided above and across said parabolic reflector, said energy absorption tube having an energy absorption fluid flowing therethrough, a frame provided on at least one end of said parabolic reflector, the improvement comprising:
   a tracking means for following the path of the sun and controlling the position of said parabolic reflector including at least one photovoltaic cell provided on either side of said energy absorption tube, said cells directed downward toward said parabolic reflector and said cells supported by said frame on one transverse side of said parabolic reflector, said tracking means solely controlled by the signals produced by said photovoltaic cells.

7. The solar collector tracking system of claim 6 wherein said tracking means includes
   a tracking rod provided in a plane parallel to the longitudinal axis of said parabolic reflector;
   a strand of wire attached to said tracking rod and one end of said parabolic reflector; and
   a reversible DC motor connected to said tracking rod for moving said parabolic reflector in two opposite directions along the transverse axis of said parabolic reflector, said motor responsive to and powered solely by the energy produced by said photovoltaic cells.

8. The solar collector tracking system of claim 7 wherein said photovoltaic cells produce a single differential signal inputted to said reversible motor for powering said motor in different directions dependent upon the polarity of said differential signal.

9. The solar collector tracking system of claim 6 wherein a plurality of photovoltaic cells are provided on either side of said energy absorption tube, said cells directed toward said parabolic reflector and said cells supported by said frame on one transverse side of said parabolic reflector.

10. A solar collector tracking system comprising:
    a parabolic reflector constructed from a thin, lightweight polyester film backed with a metalized solar-reflecting surface;
    an energy absorption tube provided above and across said parabolic reflector, said energy conversion tube having an energy absorption fluid flowing therethrough;
    a frame provided on at least one end of said parabolic reflector;
    at least one photovoltaic cell provided on either side of said energy absorption tube, said cells directed downward toward said parabolic reflector and said cells supported by said frame on one transverse side of said parabolic reflector; and
    tracking control means for following the path of the sun and controlling the position of said parabolic reflector with respect to the sun determined by the signals produced by said photovoltaic cells, said tracking control means including a reversible DC motor for moving said parabolic reflector in two opposite directions along the transverse axis of said parabolic reflector, said motor powered solely from the energy produced by said photovoltaic cells.

11. The solar collector tracking system of claim 10 wherein said photovoltaic cells produce a single differential signal inputted to said reversible motor for powering said motor in different directions dependent upon the polarity of said differential signal.

12. In a solar collector tracking system having a parabolic reflector constructed from a thin, lightweight polyester film backed with a metalized solar-reflecting surface, an energy absorption tube provided above and across said parabolic reflector, said energy absorption tube having an energy absorption fluid flowing therethrough, a frame provided on at least one end of said parabolic reflector, the improvement comprising:

a tracking means for following the path of the sun including at leat one photovoltaic cell provided on either side of said energy absorption tube, said cells directed downward toward said parabolic reflector and said cells supported by said frame on one transverse side of said parabolic reflector, said tracking means including a reversible DC motor for moving said parabolic reflector in two opposite directions along the transverse axis of said parabolic reflector, said motor solely powered by said photovoltaic cells.

13. The solar collector tracking system of claim 12 wherein said photovoltaic cells produce a single differential signal inputted to said reversible motor for powering said motor in different directions dependent upon the polarity of said differential signal.

* * * * *